(12) United States Patent
Brown et al.

(10) Patent No.: US 6,256,158 B1
(45) Date of Patent: Jul. 3, 2001

(54) CALIBRATING WRITE PRE-EQUALIZATION IN A DATA STORAGE DEVICE

(75) Inventors: Andrew David Brown; Simon John Chandler, both of Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/311,481

(22) Filed: May 12, 1999

(30) Foreign Application Priority Data

May 19, 1998 (EP) .................................................. 98303939

(51) Int. Cl.$^7$ .................................................. G11B 27/36
(52) U.S. Cl. .................................. 360/31; 360/68; 360/46; 360/53
(58) Field of Search .................................. 360/68, 55, 31, 360/65, 46, 67, 25, 53; 324/212, 226; 714/704, 774, 705, 769

(56) References Cited

U.S. PATENT DOCUMENTS

| | | |
|---|---|---|
| 5,333,081 | 7/1994 | Mitsui . |
| 5,339,202 | 8/1994 | Heinz et al. . |
| 5,550,502 | 8/1996 | Aranovsky . |
| 5,687,036 * | 11/1997 | Kassab .................................... 360/31 |
| 5,995,305 * | 11/1999 | McNeil et al. .......................... 360/46 |

FOREIGN PATENT DOCUMENTS

0651373A2   5/1994   (EP) .
08212503    11/1995  (JP) .
09219004    8/1997   (JP) .

OTHER PUBLICATIONS

European Search Report, EP 98 30 3939, dtd Oct. 27, 1998.

* cited by examiner

Primary Examiner—Alan T. Faber

(57) ABSTRACT

A method is described of calibrating a write pre-equalization circuit in the write channel of a magnetic data storage device which maximizes the rate at which the write channel can write to a data storage medium. The method includes the steps of: setting an amplitude of a delayed current to a minimum value ; setting a delay period of the delayed current to a minimum value; setting an amplitude of a main driver current to a minimum value; recording a low frequency test signal to the data storage medium; reading the low frequency test signal from the data storage medium; monitoring a quality metric of the low frequency test signal; varying the amplitude of the main driver current over a range of amplitudes; selecting an optimum amplitude of the main driver current; setting the delay period of the delayed signal to a predetermined value; recording a pseudo-random test signal to the data storage medium; reading the pseudo-random test signal from the data storage medium; monitoring a quality metric of the read pseudo-random test signal; varying the amplitude of the delayed current over a range of amplitudes; and selecting an optimum value of the delayed current, depending on the monitored quality metric.

23 Claims, 8 Drawing Sheets

CALIBRATING WRITE PRE-EQUALIZATION IN A DATA STORAGE DEVICE

FIELD OF THE INVENTION

The present invention relates to improvements to an apparatus for writing data to a magnetic tape data storage device for improving the rate at which data may be written to tape, and particularly although not exclusively to a calibration method for such an apparatus.

BACKGROUND TO THE INVENTION

In a conventional magnetic data storage system it is known to store digital data from a host device, eg a computer. It is known to store digital data to a magnetic disk or tape by switching the polarity of current through a magnetic write head which is in close proximity to a magnetic media. Conventionally, the magnetic media may comprise a flexible elongate tape which is coated with a magnetic material and which is wound between two reels past a magnetic write head. Alternatively, the magnetic media may also comprise a rigid disk which is coated with a magnetic medium and data is recorded to the disk by moving a recording head in a radial direction across the disk while the disk is rotated about its center.

In tape-based magnetic data recording systems, data may be recorded using a plurality of write heads and is read with a plurality of read heads. Conventionally, these write and read heads may be either substantially stationary with respect to the rest of the device in which case data are stored in a plurality of tracks parallel to the elongate direction of the tape or the write and read heads may be mounted on a drum which is rotated about an axis at an angle to the elongate direction of the tape, in which case the data are stored in a series of tracks diagonally across the magnetic tape.

Conventionally, recording heads are fabricated from ferrite which is a sintered combination of a ferro magnetic material and a ceramic combined to yield a material with the high magnetic permeability of the former and the high electrical resistance of the latter. However, writing data to magnetic media using ferrite heads becomes more inefficient at high data bit-rates. At high frequencies the losses due to irreversible heating of the write head results in a roll-off of the output of the write head for a given input current.

Referring to FIG. 1 herein, there is illustrated by a solid line 110 a plot indicating how an output signal of a ferrite write head decreases as the frequency of a driving write current signal of constant amplitude increases. The output signal for a given input current drops significantly at a "roll off" frequency 120 which is, typically of the order 30–40 MHz. This limits an effective maximum write rate of the ferrite head to the order 80 MBits/s. It is known to attempt to correct for this roll off in the frequency response of a write head by preferentially boosting high frequencies in the write current according to a curve such as illustrated by a dashed line 130 in FIG. 1. Preferentially boosting high frequencies in the write current signal driving the write head to compensate for the decrease in efficiency of the write head should yield an approximately flat frequency response as illustrated by the dot dashed line 140 in FIG. 1. This technique of boosting the high frequencies is conventionally known as "Write Pre-Equalization" (WPE). However, write drivers in digital magnetic data stored systems are highly non-linear devices. Conventional write drivers comprise switches which send two polarities of current to the write heads in order to record two distinct magnetization states on the magnetic media. Hence, any prior art attempts to boost high frequencies in such devices have been complex. In particular, Ampex produced a write pre-equalization scheme which comprised a linear amplifier current driver i.e. the output signal of the write driver was proportional to the input signal to the write driver. Having produced a linear write driver, the Ampex scheme applied a boost to the frequency response of the write driver to compensate for the frequency response to the write head. However, the Ampex implementation of write pre-equalization required substantial power, typically of the order 15 Watts, and could only be produced using discrete components. Hence it is not possible to implement this as a single application specific integrated circuit (ASIC). In addition, the Ampex scheme was also difficult to set up.

In addition to the roll-off in the frequency response of a recording head at high frequencies as described hereinbefore there is another, more significant, effect resulting from a finite rise time of a magnetic field generated by a record head in response to a substantially step-like change in a recording current driving said record head. In response to a, for example, positive going edge of a driver current the resulting magnetic field starts to increase in magnitude with what we shall call a positive sign. In response to a following negative going edge in the recording head driver current the magnetic field will first reduce in magnitude from a large positive value, will become zero and will then increase in magnitude with a negative sign. The changes in magnetic field do not occur instantaneously, but do so with a finite risetime, for example, 7 nanoseconds (ns).

The magnetization of the medium changes direction during the time that the magnetic field is increasing in magnitude from zero. If, at the time of the negative going edge in the recording head driver current, the magnetic field has not yet risen to its steady-state level then the next magnetic transition occurs slightly earlier than if the magnetic field had been at (or closer to) the steady-state level. This causes the physical location on a magnetic data storage medium at which the magnetization of the medium changes direction to be "advanced", or moved closer to the previous transition. Hence, positions of magnetic field transitions on a magnetic data storage medium may be laterally displaced. This lateral displacement of magnetization on the magnetic recording medium is also known herein as "bit shift", "peak shift" and "transition shift".

The size of the transition shift depends in a non-linear way on the magnetic field level when last current transition occurred, and hence on the duration of the previous current pulse relative to the finite risetime of the record head's magnetic field.

The effect of these non-linear lateral displacements of regions of magnetization on magnetic recording media can result in timing errors during a subsequent read operation of data stored on the storage medium and may result in an increase in the number of errors occurring during the read operation.

The ongoing pressure in the development of new magnetic data storage systems is to increase the data storage capacity of any said data storage media. By increasing the effective bandwidth of the write head in a magnetic data storage system it is possible to increase the bit rate at which data is written to, for example, magnetic tapes and hence increase the storage capacity of the tape. There is a need for a means to increase the bandwidth of magnetic recording heads in a way which can be implemented as an ASIC and which is straightforward to both calibrate and use.

In the applicant's co-pening application "Double Pulse Write Driver" Ser. No. 09/313,453, filed concurrently with this application, the full contents of which are incorporated herein by reference, there is disclosed a method and apparatus for compensating for the roll-off and peak shift in magnetic flux of a record head. In such a method and apparatus, there exists a problem of optimizing the compensation means to minimise the number of errors occurring whilst reading data during a send operation.

SUMMARY OF THE INVENTION

Specific embodiments and methods according to the present invention aim to provide a method for set up and optimization of a means of compensating for a frequency response roll-off in a write channel of a magnetic data storage system.

Specific methods according to the present invention, recognize that increasing the higher frequency content of signals sent to a magnetic write head to compensate as accurately as possible for the reduced magnetic flux at higher frequencies, may result in an improved effective bandwidth of the write channel and consequently increase the maximum effective data write rate achievable with such data storage systems.

According to a first aspect of the present invention, there is provided a method of optimizing a write channel in a data storage device characterized by said write channel comprising:

a first current source operable to generate a first current signal of a first current amplitude;

a delay device operable to produce a delay signal delayed by a delay period;

a second current source operable to generate a second current signal of a second amplitude; and a write head having a frequency roll off characteristic, wherein in each of said first amplitude, said delay period and said second amplitude are variable, said method comprising the steps of:

(i) varying a single said variable through a plurality of values whilst maintaining other ones of said variables at fixed values;

(ii) for each said value of said plurality of values, determining a quality metric of a corresponding output of said write channel; and (iii) selecting a said value of said plurality of values which produces a said write channel output having an optimum quality metric.

Preferably, each of said first amplitude, said delay period and said second amplitude are independently variable.

During the optimization process, said output signal of said write channel is produced in response to an input test signal, and suitably, said method comprises performing said steps (i), (ii) and (iii) for each of a plurality of test signals.

According to a second aspect of the present invention, there is provided in a data storage device having a write channel comprising:

a first current source operable to generate a first current signal of a first variable amplitude;

a delay device operable to generate a delayed data signal of a delayed period which is variable;

a second current source operable to generate a second current signal of a second variable amplitude; and a write head, a method of optimizing said first variable amplitude, said variable delay period, and said second variable amplitude, said method comprising the steps of:

for each said variable stepping said variable through a plurality of values, whilst maintaining other said variables at fixed values;

for each said variable value stepped through, inputting a test signal to said write channel and writing a corresponding output signal of said write channel to a data storage medium;

for each said output written to said data storage medium, reading said output signal from said data storage medium and determining a quality metric of said output signal; and selecting a set of said variables which produce corresponding said output signals having best said quality metrics.

According to a third aspect of the present invention there is provided a data storage device configured to write data to a data storage medium said data storage device having a write channel characterized by comprising:

a first current source capable of generating a first current signal of a first variable amplitude in response to input data signals;

a delay device, capable of delaying said data signals by a variable delay period;

a second current source capable of generating a second current signal of a second variable amplitude, in response to said delayed data signals;

a means for combining said first and second current signals;

a write head for writing said combined first and second current signals to said data storage medium;

wherein said write channel is capable of being optimized such that a frequency content of said combined first and second current signals at least partially compensates for a frequency response roll off of said write head, said optimization being effected by individually optimizing each of said variables of said first current amplitude and said second current amplitude, and said delay period.

Preferably, each said variable is adjustable independently of each other said variable.

The invention includes a method of optimizing a write channel in a data storage device configurable to write data to a data storage medium, said method comprising the steps of:

(i) setting an amplitude of a delayed current to a minimum value;

(ii) setting a delay period of a delayed current to a minimum value;

(iii) setting an amplitude of a main driver current to a minimum value;

(iv) recording a low frequency test signal to said data storage medium;

(v) reading said low frequency test signal from said data storage medium;

(vi) monitoring a quality metric of said read low frequency test signal;

(vii) varying said amplitude of said main driver current over a range of amplitudes; and (viii) repeating steps (iv) to (vi) above at said varied amplitudes of said main driver current;

(ix) selecting an optimum amplitude of said main drive current depending on a result of step (vi);

(x) setting said delay period of said delayed signal to a predetermined value;

(xi) recording a mixed frequency test signal to said data storage medium;

(xii) reading said mixed frequency test signal from said data storage medium;

(xiii) monitoring a quality metric of said read mixed frequency test signal;

(xiv) varying said amplitude of said delayed current over a range of amplitudes; and (xv) repeating steps xi, xii, xiii for each of a set of amplitudes of said delayed currents; and (xvi) selecting an optimum value of said delayed current depending on a result of step xiii.

Advantageously, said low frequency test signal comprises a "4T" pattern.

Said quality metric may comprise a signal-to-noise ratio, or bit error rate.

Suitably, said predetermined value of delay is set in the range ⅕ to ⅘ of the minimum bit period at which said data are written to said data storage medium and suitably at around ⅓ of said minimum bit period.

Suitably, said predetermined value of delay is set in the range 1.8 to 7.2 nanoseconds and suitably at around 3.5 nanoseconds. Said predetermined value of delay in the best mode, lies within the range 1.8 to 7.2 nanoseconds.

Suitably, said mixed frequency test signal comprises a pseudo random pattern.

Suitably, said mixed frequency test signal comprises a "1T" bit pattern.

The invention includes a method of writing data to a data storage medium, through a write channel comprising a first transconductor, a delay device and a second transconductor, said method comprising the steps of:

receiving said data from a data source;

writing said data to a first transductor, wherein a degree of amplification of said first transductor is varied;

writing said same data to a delay device, wherein a delay time introduced by said delay device is varied;

writing said delayed data to a second transductor, wherein a degree of amplification of said second transductor is varied;

combining outputs of said first and said second transductors;

writing said combined outputs to said data storage medium;

wherein, said write channel is optimized to produce an optimum data rate by determining an optimum value of each said variable in response to a measure of quality of said combined outputs as written to said data storage medium.

To perform said step of optimization, said data is preferably replaced by a test signal. A frequency of said test signal is varied.

Preferably, said step of optimizing said variables comprises the steps:

(a) setting said degree of amplification of said first transductor to a minimum value;

(b) setting said delay time introduced by said delay device to a minimum;

(c) setting said degree of amplification of said second transductor to a minimum value;

(d) recording a low frequency test signal to said data storage medium;

(e) reading said low frequency test signal from said data storage medium;

(f) monitoring a measure of said quality of said writing of said low frequency test signals;

(g) varying said degree of amplification of said first transductor over a range of degrees of amplification;

(h) repeating steps d, e, f above at said varied degrees of amplification of said first transductor;

(i) selecting an optimum degree of amplification of said first transductor depending on a result of step f;

(j) setting said delay time of said delay device to a predetermined value;

(k) recording a mixed frequency test signal to said data storage medium;

(l) reading said mixed frequency test signal from said data storage medium;

(m) monitoring a measure of a quality of a said read mixed frequency test signal;

(n) varying said degree of amplification of said second transductor over a range of degrees of amplification;

(o) repeating steps (k), (l), (m) for each of a set of degrees of amplification of said second transductor; and (p) selecting an optimum value of said degree of amplification of said second transductor as a result of step (m).

The data storage medium may comprise a magnetic tape, a magnetic disk or the like.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Specific methods according to the present invention described herein may be particularly suited to magnetic tape recording devices having a rotating read/write head in which an elongate tape is drawn past the head and the read/write heads rotate about an axis aligned at an angle to the direction of the tape motion. However, the generality of the present invention described herein is limited in scope only by the essential features according to the claims herein.

In particular, the best mode herein relates to a Digital Data Storage system (DDS) based on the digital audio tape system (DAT) being a helical scan system. The tape data storage system presented herein may advantageously implement one particular version of the DDS system namely the DDS4 standard which is still under development. However, it will be understood by those skilled the art that the methods and apparatus disclosed herein are not restricted to systems having rotating heads or to systems where digital data are stored on tape.

Figure 2:
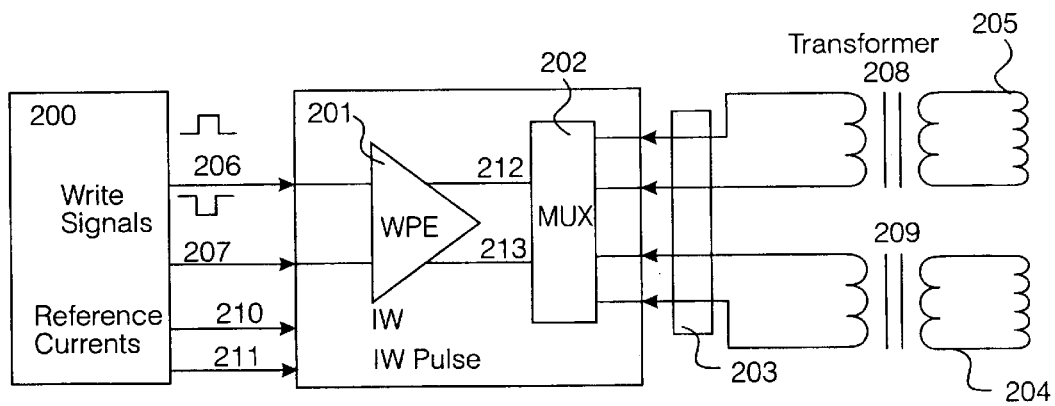
FIG. 2 illustrates schematically a block diagram of part of a write channel of a data storage device described herein.
Figure 3:
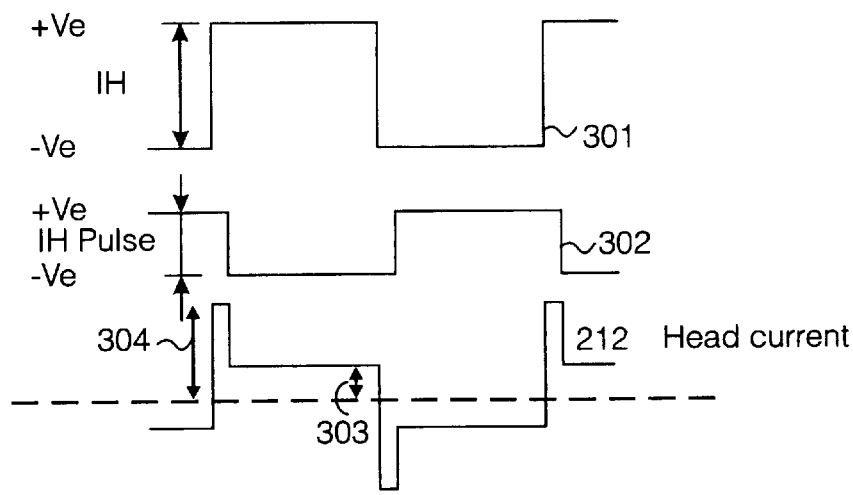
FIG. 3 illustrates schematically how a main driver current and a delayed inverted driver current are summed to produce a modified write driver current according to a specific implementation of the present invention.
Figure 4:
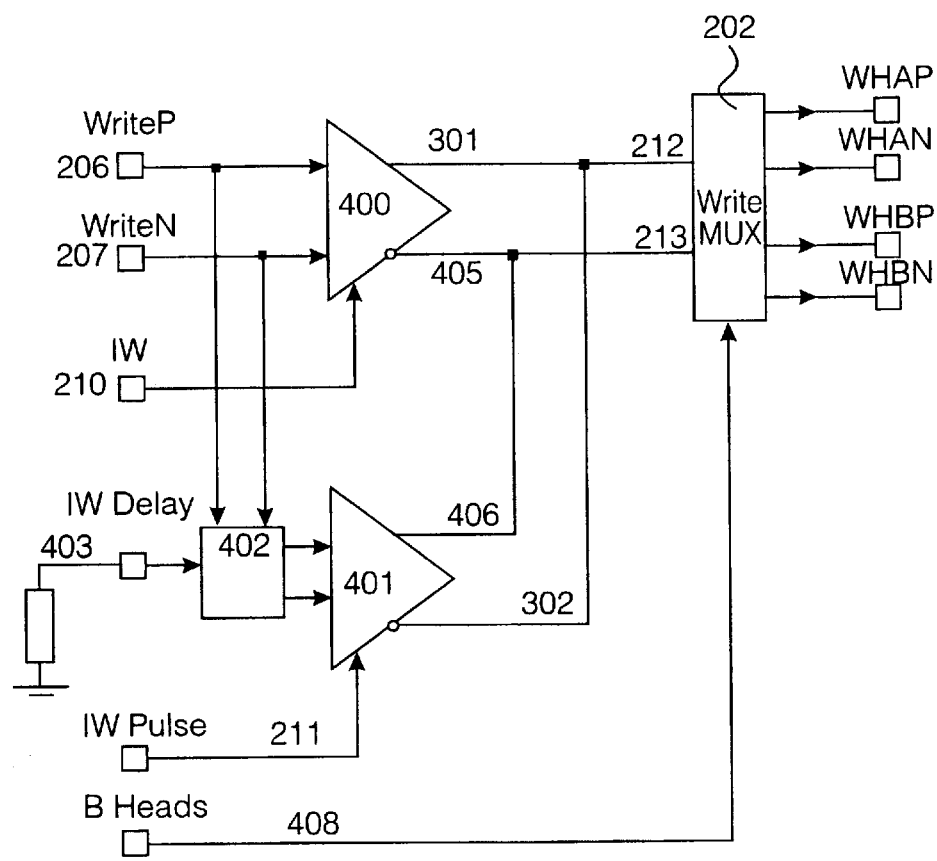
FIG. 4 illustrates schematically means for implementation of a summation of a main driver current with an inverted delayed version of the main driver current according to a specific embodiment of the present invention.

Referring to FIGS. 2 to 4 herein, there is illustrated schematically a device which records digital data onto magnetic tape using two write heads mounted on a rotating drum. A channel ASIC 200 provides a source of logic signals which are to be recorded on to a tape according to the best mode presented herein. The channel ASIC 200 converts a stream of digital data from the host device into streams of digital data write signals 206 and 207 with appropriate voltage levels to input into a write driver 201. Data stream 207 is an inverted version of data stream 206.

The process of inverting a digital signal comprises replacing every instance of the digital signal which represents binary digit "0" with a digital signal that represents binary digit "1" and replacing every instance of the digital signal which represents a binary digit "1" with a digital signal representing binary digit "0". The voltage levels output by channel ASIC 200 conform to the voltage levels conventionally used in known pseudo emitter coupled logic (PECL). The two logic states are typically represented by a differential voltage swing of 1V peak-to-peak. PECL has, typically, the same differential voltage swings as conventional emitter coupled logic (ECL) but have been translated by +5V. PECL is a well known way of transferring logic signals where the timing of such signals is critical.

The write signals 206 and 207 are input to the double pulse write driver 201. The write driver 201 outputs conventional write current signals set by external reference currents 210 and 211. Write currents 212 and 213 output from write driver 201 have an extra narrow pulse of current added on each transition according to one aspect of the present invention. The width of this narrow current pulse is set by an external reference current and an external resistor or capacitor. The write current 212 and 213 are input to a multiplexor 202 which switches the write current between the two write heads 204 and 205 via a coupling 203 and transformers 208 and 209. The coupling 203 comprises a connection between the physical location of the double pulse write driver as described herein and either the transformers 208 and 209 or the write heads 204 and 205.

Referring to FIGS. 3 and 4 herein, there is illustrated schematically write signals combined to produce modified write signal 212 configured according to one aspect of the present invention described herein to compensate for high frequency roll off of a write head. Driver current 301 is produced by a first transconductor circuit 400 which produces two write output signals in response to two input signals. The output signals of the first transconductor are amplified versions of the write signals 206 and 207 input into first transconductor 400. The input signals are also input to a delay unit 402, the outputs of the delay unit being input to a second transconductor 401. Write signals 206, 207 input to first and second transconductors respectively each comprise a digital logic voltage signal. Outputs of the first and second transconductors comprise current signals. Each transconductor comprises a buffer, a switch and a current amplifier source, the combination of buffer, switch and current amplifier source operating to receive a said voltage logic signal and output a current pulse drive signal of predetermined and controlled current value. To the main driver current 301 is added an inverted and delayed driver current 302. The amplitude of the pulses in the driver current and delay current are represented in FIG. 3 herein as IH and IH_delayed, respectively. The amplitudes of main driver current 301 and delayed current driver 302, IH and IH_delayed respectively, are set by the reference currents 210 and 211 and may be preset. The driver current 301 and delayed current 302 are added to produce a modified write signal 212, head current. The effect of adding the delayed inverted current 302 to driver 301, if IH_delayed is less than IH, is to produce a respective double pulse current spike corresponding to each transition of the main driver current. The double pulse comprises a narrow pulse which has a positive going edge which is coincident with a positive going edge of the driver current 301 followed by a pulse spike having a lower amplitude but being of longer duration. At each negative going edge of the main driver current there is a coincident negative going narrow pulse in the sum current. The positive going and negative going narrow pulse spikes are of a same duration.

The narrow pulse which is also known herein as the pulse current I_pulse has an amplitude 304 which is equal to $$\frac{(1H + 1H \text{ delayed})}{2}$$

similarly, the pulse spike having a lower amplitude having a lower amplitude but being of longer duration which is also known herein as the main current or I_main has an amplitude 303 which may be represented by the following equation $$\frac{(1H - 1H \text{ delayed})}{2}$$

According to the best mode presented herein, both the pulse current and main current are independently adjustable to produce an optimum performance of the write pre-equalisation.

Taking the Fourier transform of the narrow and broad pulse components of the sum head current 212 it will be understood that the narrow pulse contributes significantly to the high frequency components of the sum (head) current 212. These additional high frequency components in the write current partially compensate for the roll-off in the frequency response of the write head at approximately 40 MHz. According to the best mode presented herein, the additional high frequency components added to the write current result in an improved effective bandwidth of the write heads, and as a result may increase the roll off in the response of the write channel as a whole, including the write head, from approximately 40 MHz up to approximately 80 MHz.

Additionally, the addition of an initial narrow pulse at a positive going edge of a pulse of the sum head current may be configured such that, irrespective of the duration of the head pulse ie 1T, 2T, 3 T or 4 T, the magnetic field generated across the head gap of the recording head is at a substantially same value whenever a negative going edge of the sum head current is encountered. Ensuring that a decreasing magnetic field in the recording head gap always starts from a substantially same value of field strength allows the occurrence of "bit shift" as described hereinbefore to be minimized. The initial narrow current pulse results in a more rapidly increasing magnetic field than in the case of a conventional driver current pulse. The more rapid increase in the magnetic field generated in response to the sum head current is to ensure that the resulting magnetic field is at a correct, predetermined level in time for a negative going edge of a sum head current to initiate a decrease in magnetic field.

Referring to FIG. 4 herein, there is illustrated schematically, in more detail the double pulse write driver 201 and multiplexer 202. According to the best mode presented herein, the double pulse write driver and multiplexer are implemented on a single application specific integrated circuit (ASIC). The two logical signals WriteP 206 and WriteN 207 from Channel ASIC 200, are written to amplifier 400. In addition, logical signals writeP 206 and writeN 207 are written to delay unit 402. The delay circuit stores and delays logical signals 206 and 207 for a short period of time. The delay period is designed to be easily adjustable and calibrated either by changing the value of a single resistor or capacitance external to the ASIC. In the best mode presented herein, where the write head roll-off frequency is typically of the order 30–40 MHz, the optimal time by which the logical signals should be delayed is found to be of the order of 3.5 ns where the bit period is 9 ns. The delayed logical signals are written to transconductor 401. In the best mode presented herein, transconductors 400 and 401 have substantially similar properties. Transconductors 400 and 401 are both conventional. The electronic circuitry comprising amplifier 401 is preferably a direct copy of the electronic circuitry comprising amplifier 400. One advantage of the best mode described herein is that it is straight forward to implement the invention in an integrated circuit using known techniques.

The delayed logical signals are read out from amplifier 401 and are combined with the output of transconductor 400 prior to sending to write multiplexer 202. The output signals of second transconductor 401 and first transconductor 400 are combined in the following manner. The driver current 301 is added to delayed current 302 and inverted delayed driver current 406 is added to delayed driver current 405 yielding the respective head currents 212 and 213 which are used to drive the write heads.

The head current 212 and its inverted counterpart 213 are written to the write multiplexer 202. The write multiplexer switches the sum currents 212 and 213 between two write heads according to switching signals 408. Write current 212 is switched between inputs WHAP and WHBP which correspond to the two write heads 204 and 205. Similarly, write current 213 are switched between inputs WHAN and WHBN. In this specification a "write pass" is defined as a single passage of the tape past a write head for writing onto a single track, irrespective of whether the tape speed varies, or whether the tape stops during a pass. A write pass may comprise a sequence of writes which cause data to be written in a sequence along one or more tracks, which are themselves written in sequence. Whilst a write channel serving two write heads is shown in the best mode herein, the invention applies equally to a write channel having a single write head, or any other plurality of write heads.

Figure 5:
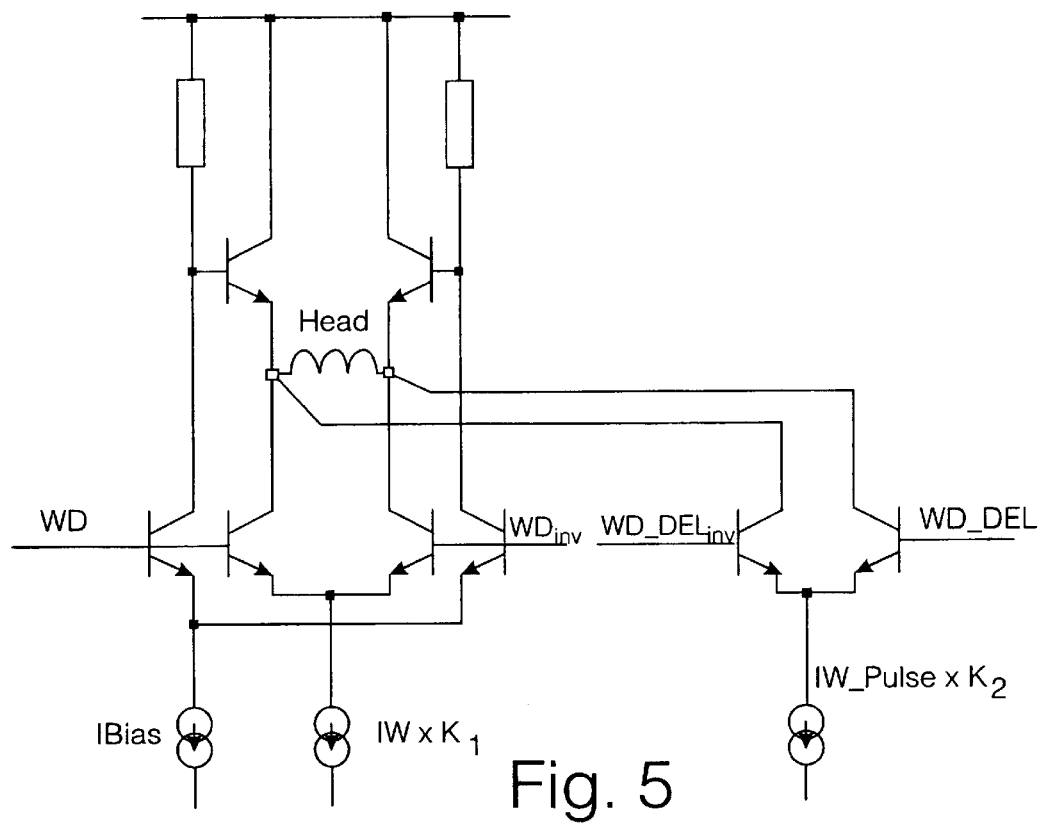
FIG. 5 illustrates schematically a circuit comprising a write driver according to a specific embodiment of the present invention.

Referring to FIG. 5. herein, there is illustrated schematically an example of an H-Bridge write driver circuit according to the best mode presented herein. The input signals WD and $WD_{inv}$, correspond with the logical signals 206 and 207 respectively. The outputs of the H-Bridge circuit comprise the driver currents 301 and 405. In addition, there is included an additional H-Bridge circuit according to the present invention described herein. The additional H-Bridge circuit receives the delayed logical signals WD_DEL and $WD\_DEL_{inv}$ which are the delayed versions of logical signals 206 and 207 respectively after having been read from the output of delay unit 402.

The amplitudes of the driver currents 301 and 405 and the delayed driver currents 406 and 302 which are combined before sending to the write heads are set by reference current IW×K1 and IW-Pulse×K2. K1 and K2 are constants chosen to ensure that driver currents 301 and 405 have larger amplitudes than the delayed currents 406 and 302.

Figure 6:
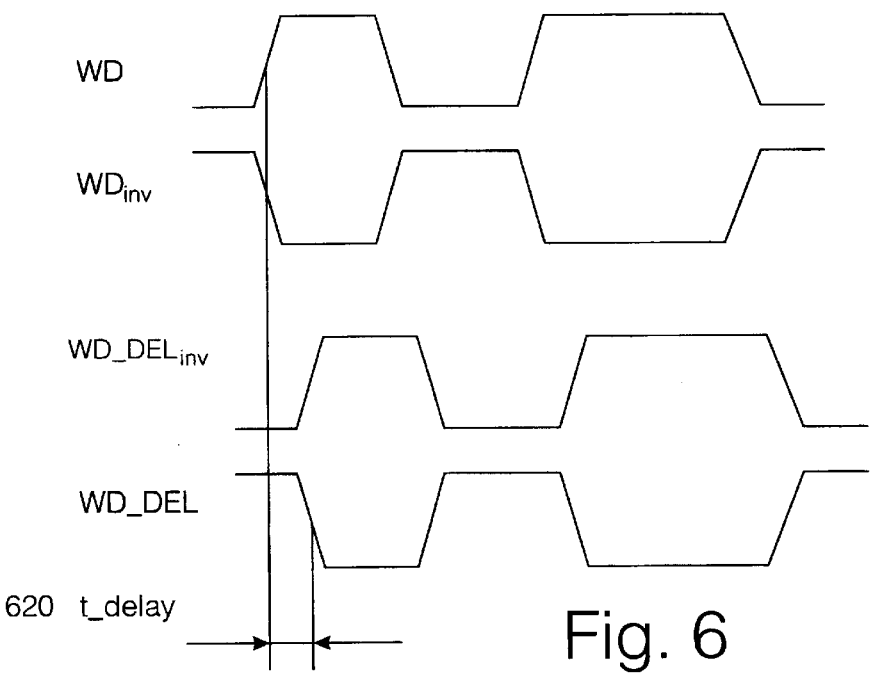
FIG. 6 illustrates schematically a set of logic signals WD, $WD_{inv}$, WD—DEL and WD—$DEL_{inv}$, which are input to a set of buffers, and a time delay t—delay between the two sets of logic signals according to a specific implementation of the present invention.

Referring to FIG. 6 herein, there is illustrated schematically driver currents signals WD, $WD_{inv}$, and delayed currents WD_DEL and $WD\_DEL_{inv}$. The time delay introduced by delay unit 402 is indicated by t_delay 620. As indicated in FIG. 6 the driver currents signals have a finite rise time which is the time taken for the current to change from the value representing binary digit "0" to the current representing binary digit "1". The same finite transition time is observed for the transition from binary digit "1" to binary digit "0". One of the key requirements of the write driver is to minimize the rise time of the driver currents. Typical values of the expected range in write current according to the best mode herein are 30 mA to 100 mA. Typically, a write head having inductance of the order 100 to 200 mH may be used.

Figure 7:
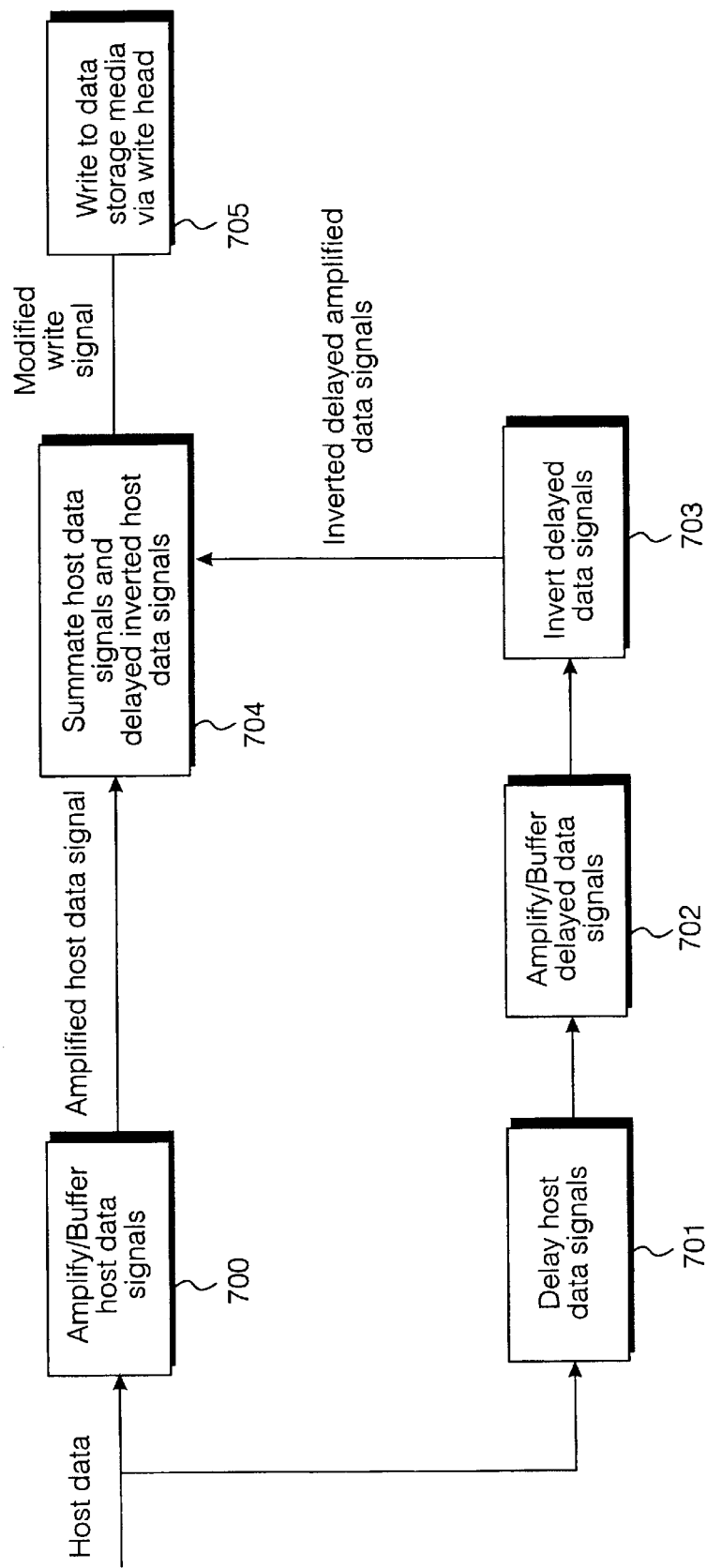
FIG. 7 illustrates schematically signal processing steps for data signals passing through a write channel according to a specific method of the present invention.

Referring to FIG. 7 herein, there is illustrated schematically a signal processing diagram for processing of the host data signals into a form which includes frequency components which compensate for a higher frequency roll off of the ferrite write head. Incoming host data signals in the form of bit pulses are split into first and second signal paths, the first path being amplified/buffered in first transconductor 400 by a first degree of amplification 700. The second signal path of host data signals is delayed by delay device 402 for a predetermined delay period, which may be varied by adjustment. The delayed host data signals are amplified/buffered in second transconductor 401, which also inverts the delayed host data signals and amplifies the host data signals by a second degree of amplification, the second degree of amplification being less than the first degree of amplification. The inverted delayed data signals are summed 704 with the amplified host data signal to produce a modified write signal as illustrated by sum (head) current 212 in FIG. 3 herein. The modified write signal is of the form described hereinabove, containing a relatively short higher amplitude pulse current on a leading edge of each main current pulse, which introduces higher frequency components which compensate for a higher frequency roll off of the write head. The modified data write signal is written to the tape data storage medium via the write head 705. Since the introduction of higher frequency components into the modified data write signal compensates for a frequency response roll off of the write head, the resultant data signals written to the tape data storage medium may be better defined and have a better signal to noise ratio and/or a lower bit error rate than in the prior art case.

The write driver, according to the best mode presented herein, addresses the problem of the roll-off in the frequency response of ferrite recording heads in magnetic data storage devices. However, the write driver described herein requires that three separate variables, amplitude of the pulse current I_Pulse 304, the amplitude of the main current I_main 303 and the width of the pulse current t_delay 620 are all chosen so as to optimize the effective frequency response of the write channel using the WPE method and apparatus scheme described.

The process of calibrating a write driver requires optimizing the operation of the write driver such that, for example, the number of errors occurring when data are written to tape are minimized. Conventional write drivers have typically only one variable to optimize during a calibration process. Such a calibration process would conventionally comprise writing data to tape, then reading the data from tape and analyzing a quality metric which is a measure of the quality of the writing process. The quality metric may be typically a measure of the bit error rate, ie the proportion of incorrectly written bits of data introduced during the write operation. Such bit error rates in prior art schemes are, before error correction, of the order 1 in $10^5$–$10^6$ bits in tape drives, whilst bit rate errors incurred in write operations in disk drives are typically lower than for tape drives. Another quality metric typically used to assess the write operation in writing data to a data storage medium is signal-to-noise ratio. In a conventional calibration process, bit error rate (BER) and/or signal-to-noise (SNR) are used to assess a write operation. In conventional write drivers, calibration can involve writing standard signals to tape while sweeping a single variable through all possible values of that variable whilst monitoring a quality metric of the resulting written data.

However, the write driver described herein operates a modified data write signal as illustrated in FIG. 3 herein having a head current a pulse current of a first amplitude and duration followed by a second portion by a main current of a second amplitude and duration. To produce such a modified signal, three variables are present, being an amplitude of the pulse current I_Pulse 304, a width of the pulse current t_delay 620, and an amplitude of the main current signal I_main 303. With three independent variables, calibration of the driver circuitry to produce optimized performance becomes a complex problem to solve. If there are of the order 10 possible values of each of the variables then there are of the order $10^3$ possible calibration points. Typically, finding the optimal value of any one variable can take of the order of a few seconds.

Therefore, searching for one out of $10^3$ points could potentially take of the order $10^3$ seconds. Even using efficient algorithms, finding the optimal values of three variables would still require an unrealistically long timescale when applied to production of tape drive devices. Calibration of data storage devices is a process which must be applied to each individual data storage device and possibly repeated throughout the lifetime of such devices in order to compensate, for example, for small changes in the values of the components in the write channels and for changes in the characteristics of the recording heads. Given the frequency with which the calibration process is performed it is important to develop a calibration process which reduces the time required to find the optimal values of the three variables in the WPE method described herein to a minimum.

Figure 8:
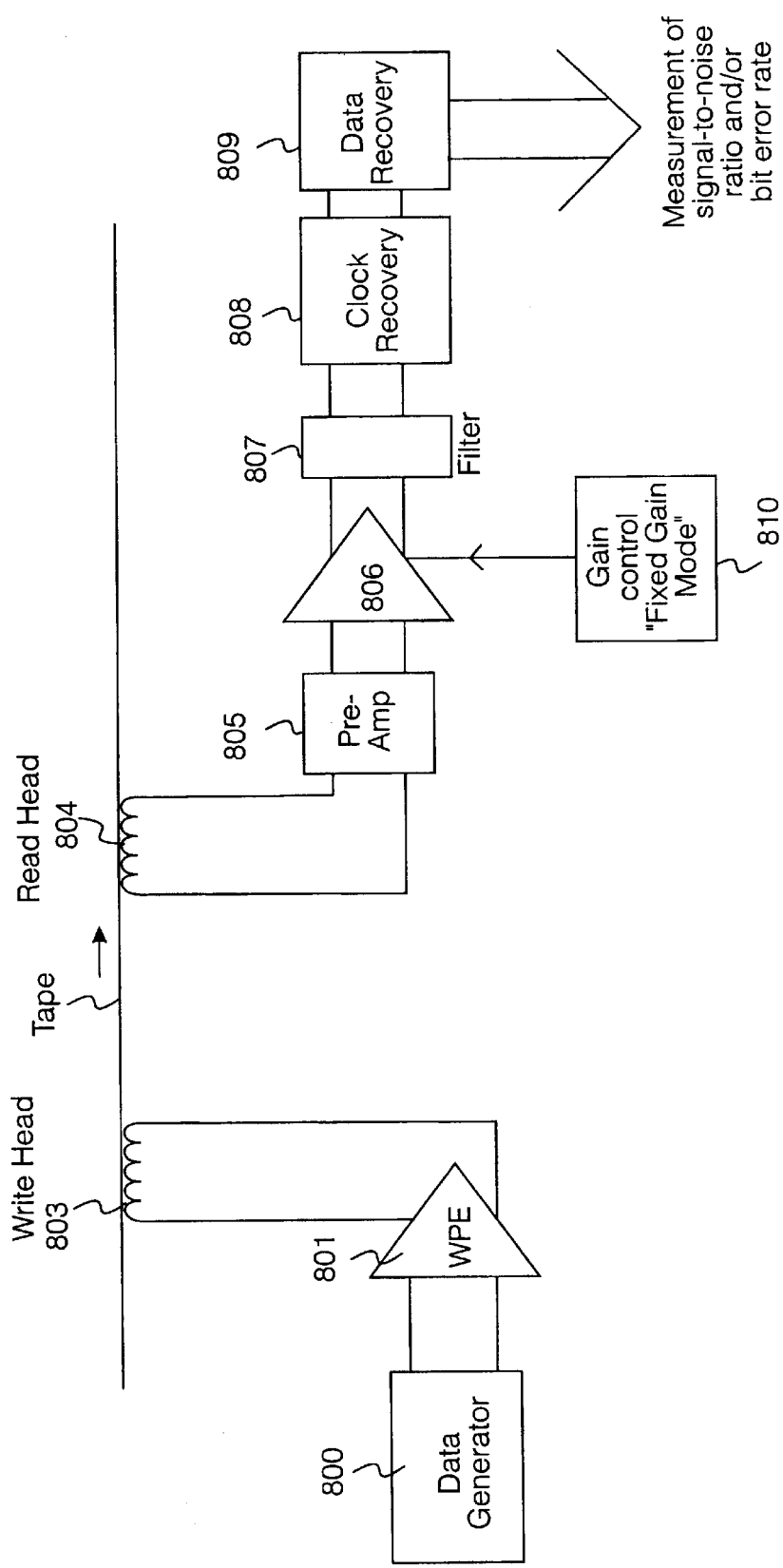
FIG. 8 illustrates schematically a tape data storage device according to the best mode presented herein, being configurable to generate and write test signals to tape, re-record test signals on tape and measure quality metrics characterizing the write process.

Referring to FIG. 8 herein, there is illustrated schematically a tape data storage device configured to write data to an elongate tape using a write head is 803 and to recover said data from tape using a read head 804. The tape data storage device as illustrated in FIG. 8 is configured to write a plurality of test signals to tape via a write channel, read the test signals from tape via a read channel and measure a quality metric of the write operation according to the present invention described herein. Data generator 800 feeds logic signals to WPE write driver 801 which drives the write head 803 as described herein before. During the calibration procedure described herein, a plurality of data patterns generated by data generator 800 are written to tape. The plurality of data patterns are test signals which can be used to yield a quality metric of the writing process. The test signals written to tape are read back from tape using read head 804. The signals read off tape pass through pre-amplifier 805, variable gain amplifier 806 which is set to "fixed gain" mode, filter 807, clock signal recovery stage 808, and data recovery stage 809. In the best mode described herein, during the calibration procedure, the variable gain amplifier 806 in the read channel is set to "fixed gain" mode which means that the amplification applied to test signals read back from tape is substantially constant with frequency. Having the read channel set to a known characteristic it is then possible to optimize the write channel by examining the quality metrics of bit error rate (BER) and/or signal-to-noise ratio (SNR), for a set of test signals comprising a plurality of frequencies.

Figure 1:
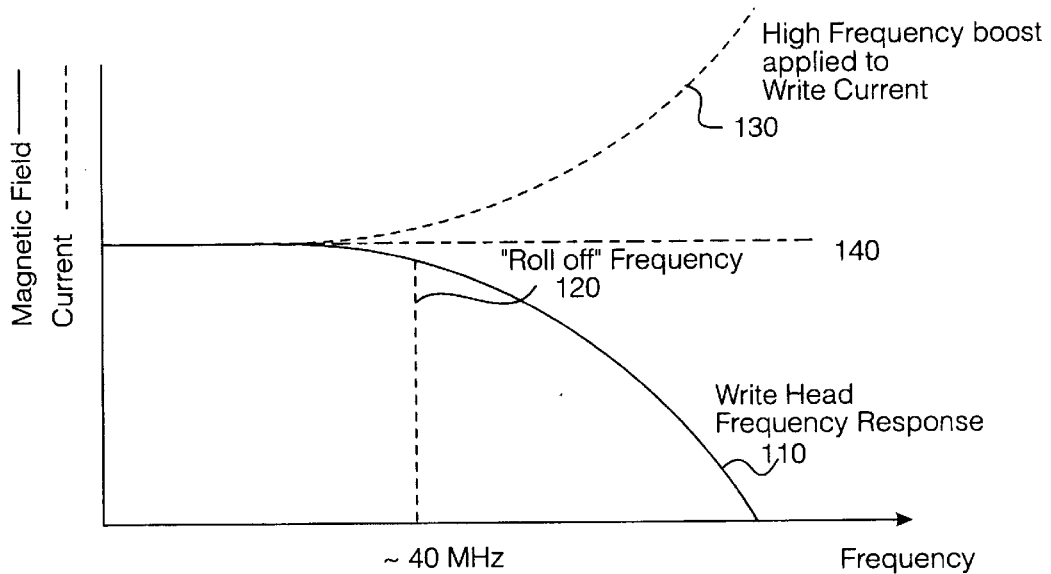
FIG. 1 shows a plot of the frequency response of the output of a ferrite write head.

The calibration method described herein comprises optimizing the write channel to write low-frequency signals to tape and then optimizing the write channel whilst writing mixed frequency signals to tape. Referring again to FIG. 1 herein, an objective of calibration of the compensation means is to approximate an optimum high frequency amplification applied to the write current as shown by the dotted line in FIG. 1 as closely as possible by variation of the three variable parameters of main drive current signal amplitude, delay period and delayed main drive current signal amplitude. A correctly calibrated WPE driver adjusted to accurately compensate for the high frequency roll off of a write head should yield a substantially same value of quality metrics when writing both low frequency data, which is unaffected by the roll-off of the recording head, and high frequency data, which is subject to the high frequency roll off of the write head.

Another objective of calibration of the compensation means is to ensure that a changing magnetic field generated by a record head in response to a positive going edge of a driver current rises to a same value irrespective of a time duration of the driver current pulse, ie 1T, 2T, 3T or 4T. Ensuring that the magnetic field rises to a fixed value irrespective of the duration of the driver current pulse initiating the rising magnetic field reduces the occurrence of lateral displacement of changes in magnetization direction on the magnetic data storage medium. Minimizing relative lateral displacements between pulses recorded on magnetic data storage medium minimizes the occurrence of timing errors during a subsequent read operation and thereby minimizes the measured bit error rate.

Figure 9:
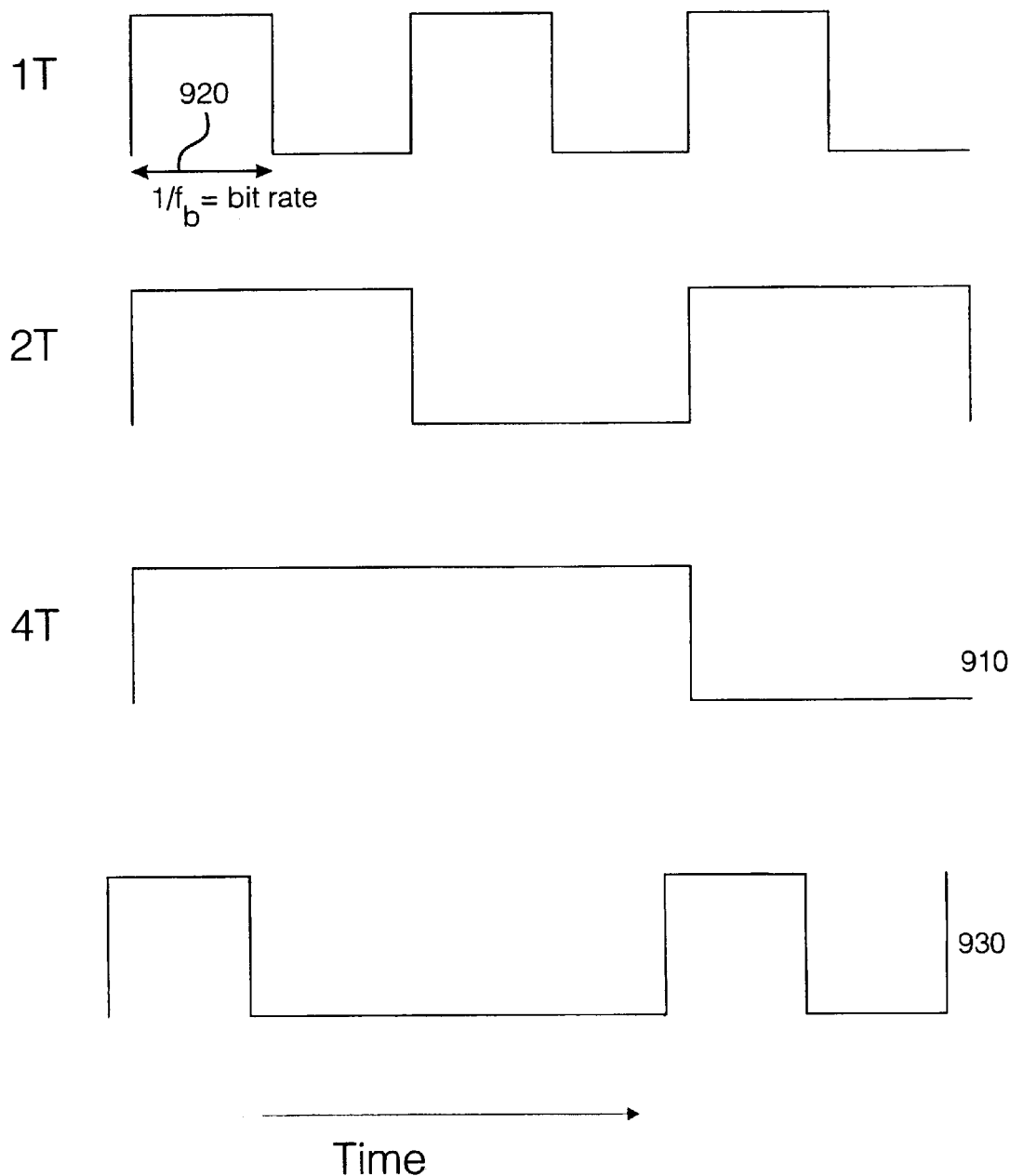
FIG. 9 illustrates schematically 1T, 2T, 3T, 4T and pseudo-random bit patterns, the pseudo-random and 4T patterns being used in calibrating the write pre-equalisation circuit according to a specific implementation of the present invention.

Referring to FIG. 9 herein, there is illustrated schematically low frequency 910 and pseudo-random 930 test signals used to calibrate the WPE driver. The low frequency test signal written to tape as part of the calibration procedure for the WPE driver is a "4T" pattern 910. The 4T pattern has a pulse duration of $4 \times f_b$ seconds where $1/f_b$ 920 is the bitrate at which data are written to tape during the normal operation of the tape data storage device described herein. The 4T pattern has a frequency which is one quarter of the maximum frequency which is written to tape. The 4T pattern should be of low enough frequency that, when writing to tape, it is unaffected by transient effects resulting from, for example, the finite rise time of the magnetic field in the write heads. Thus, the optimal values of the quality metrics derived from writing a 4T pattern to tape can be used as a standard for comparison with the quality metrics of writing mixed frequency test signals to tape.

According to the best mode described herein, the WPE driver has three independently adjustable variables, all of which must be optimized in order to optimally compensate for the roll-off of the write head. The three variables are: the value or amplitude of the pulse current, I_pulse 304; the value or amplitude of the main current, I—main 303; and the width of the pulse current, t_delay 620. The specific method as described herein comprises "removing" one of the variables by writing a 4T pattern to tape and optimizing the amplitudes of the main current 303. In this specification the process of optimization refers to finding the value of a variable which maximizes one or more quality metrics during a write operation. In a first embodiment of the present invention, having found the optimal main current driver value while writing a 4T pattern 910, and with the pulse current amplitude set to a minimum value, a high frequency 1T, bit pattern is recorded and an optimal pulse current is found. However, in a preferred embodiment of the present invention, having found the optimal main driver current value while writing a 4T pattern 910, and with the pulse current amplitude set to a minimum value, a mixed frequency, pseudo-random bit pattern 930 is recorded and an optimal pulse current amplitude is found. Thus, by fixing the main current level the parameter space that needs to be searched to find the optimal values of variable for the WPE method described herein may be significantly reduced.

Figure 10:
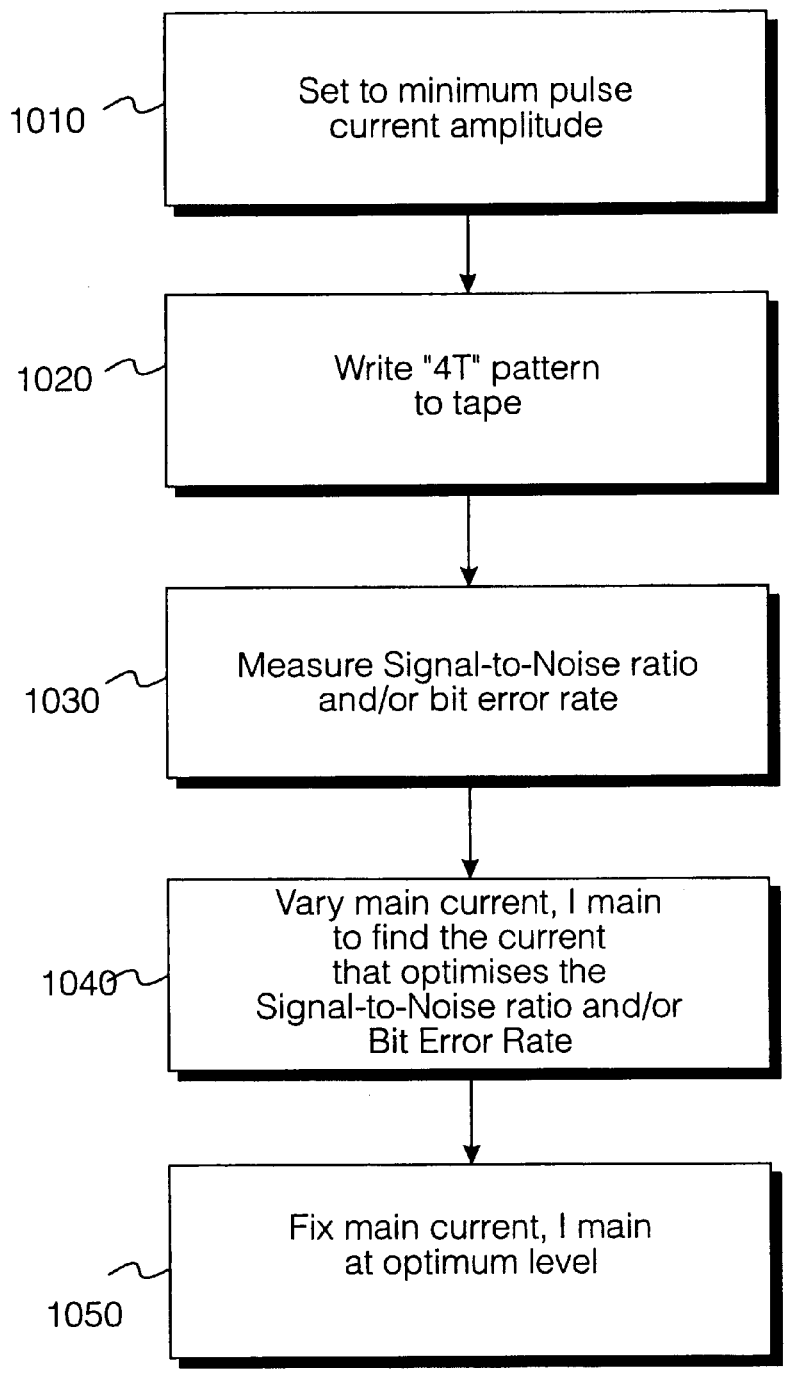
FIG. 10 illustrates schematically steps involved in calibrating the write channel of a data storage device at low frequencies according to a specific method of the present invention.

Referring to FIG. 10 herein, there is illustrated schematically a summary of steps involved in optimizing the main current amplitude 303 according to the best mode described herein. In step 1010, the amplitude of the pulse current, 304 is set to its respective minimum value. The width of the pulse current is set to a predetermined fixed value. In step 1020, the data generator 800 is configured to output a 4T pattern. The main current, I-main, is set to its minimum value, and the 4T pattern is written to tape. In step 1030, the 4T pattern written to tape using write head 803 is read back from tape via write head 804. The low frequency 4T pattern is recovered from the data read off tape and the quality metrics signal-to-noise ratio and/or bit error rate associated with the value of the main driver current used to write the data are measured. In step 1040, the gain of amplifier 400 is increased and the low frequency 4T pattern is again written to tape. The quality metrics associated with the new, increased main current are measured and the process of changing the main current level, recording low frequency pattern to tape and measuring the quality metrics associated with that driver current are repeated until the main current level that maximizes SNR and/or minimizes BER is found. In step 1050, the main current is fixed at a level which optimizes the values for the quality metrics used to assess the write performance.

Figure 11:
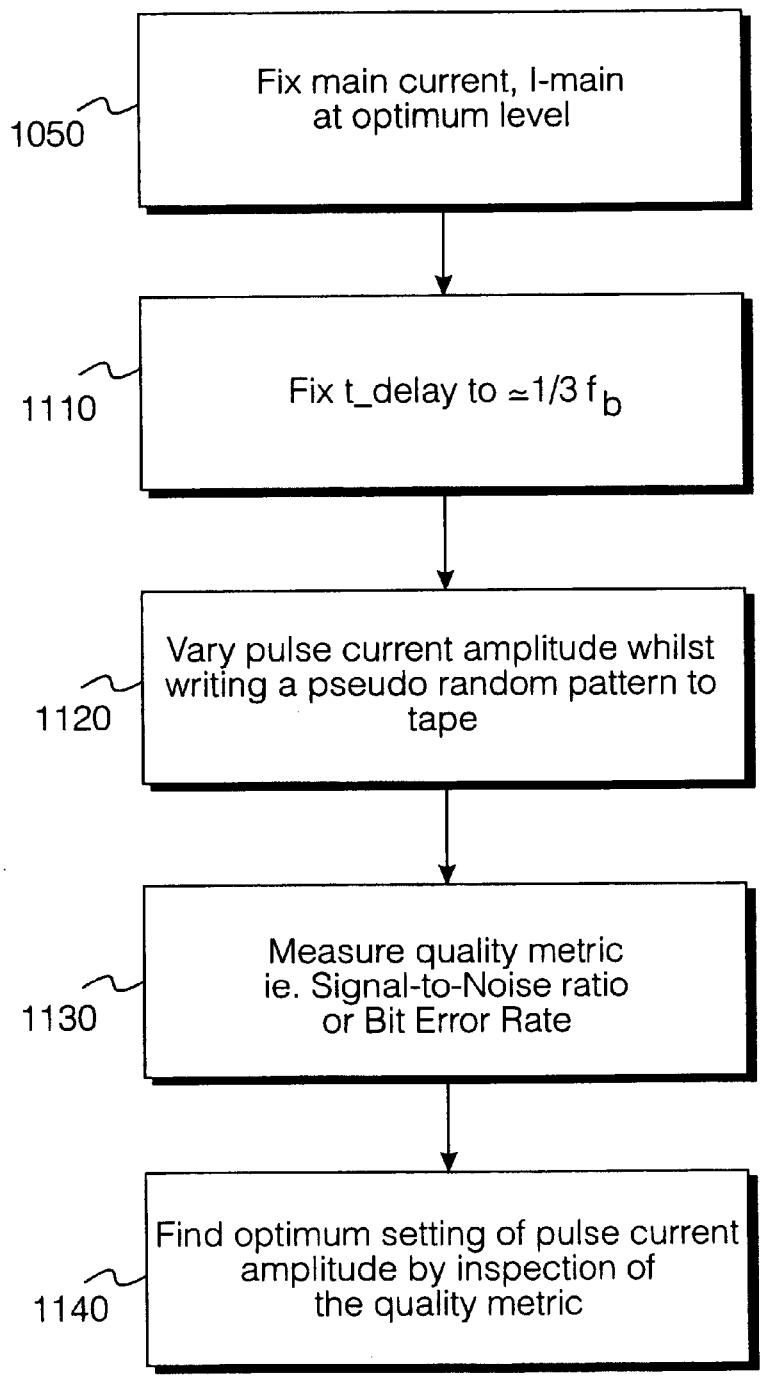
FIG. 11 illustrates schematically steps involved in calibrating the write channel of a data storage device using a pseudo-random test signal according to a specific method of the present invention.

Referring to FIG. 11 herein, there is illustrated schematically a flow chart summarizing steps in calibrating the WPE driver whilst recording pseudo-random bit pattern to tape according to the best mode described herein. Preferably, a pseudo-random bit pattern used in calibrating the WPE driver comprises a pseudo-random mixture of 1T, 2T, 3T, 4T transitions. Thus the pseudo-random bit pattern contains a mix of frequencies. However, it will be understood by those skilled in the art that the invention is not limited to methods and apparatus using pseudo-random patterns to calibrate the WBE driver and that other random or quasi-periodic bit patterns could be employed. In step 1050, as described previously, the optimum level of main current, I-main, for recording low frequency, 4T, patterns to tape is found. In step 1110, the time delay t_delay which is the width of the pulse current is fixed at a value of the order $1/3$ $f_b$ seconds where $f_b$ is the bit period at which data are written to tape according to the best mode described herein. Preferably, the bit period $f_b$ is 9 nanoseconds. It has been found experimentally that the pulse current, 303, and the width of the pulse current, t_delay, are not truly independent variables. Thus, it has been found that t_delay can be fixed at an optimal value and hence it only remains to find the value of the pulse current amplitude 303 which maximizes the quality metrics in order to complete the calibration of the WPE driver. Preferably, t_delay is set to of the order 1/5–4/5 of the bit period $f_b$. In step 1120, the pulse current amplitude 303 is set to its minimum value and the generator 800 is configured to generate a pseudo-random bit pattern which is recorded to tape. In step 1130, the pseudo-random test signal is read back from tape and the quality metrics SNR and/or BER are measured for the mixed frequency test signal. In step 1140, the quality metrics are monitored as the pseudo-random bit pattern is recorded to tape whilst the pulse current amplitude is gradually increased. An optimal pulse current value which maximizes the quality metrics whilst recording a mixed frequency signal is found, completing the calibration of the WPE driver. One advantage of fixing the time delay of the delayed current to $1/3$ $f_b$ is that this reduces the number of combinations of variables and hence the time required to calibrate the WPE driver.

The specific method described herein above encompasses varying a single one of the three variables through a plurality of values whilst maintaining other ones of the variables at fixed values, and for each value of variable, determining a quality metric of a corresponding output of the write channel as written to tape. A value of variable which produces a write channel output which when written to tape and read by the read channel produces an optimum quality metric is selected.

What is claimed is:

1. A method of optimizing a write channel in a data storage device, said write channel comprising:

a first current source operable to generate a first current signal of a first current amplitude;

a second current source operable to generate a second current signal of a second amplitude;

a delay device operable to produce a delay period between said first current signal and said second current signal; and means for adding said first and second current signals having a delay period therebetween to form a data write signal which is input to a write head having a frequency roll off characteristic, wherein in each of said first amplitude, said delay period and said second amplitude are variable, said method comprising the steps of:

(i) varying one of said first amplitude, said delay period and said second amplitude through a plurality of values while maintaining the other ones of said first amplitude, said delay period and said second amplitude at fixed values;

(ii) for each value of said plurality of values, determining a quality metric of a corresponding output of said write channel; and (iii) selecting a value of said plurality of values which produces a write channel output having an optimum quality metric.

2. The method as claimed in claim 1, wherein each of said first amplitude, said delay period and said second amplitude are independently variable.

3. The method as claimed in claim 1, wherein said output signal of said write channel is produced in response to an input test signal, and said method comprises performing said steps (i), (ii) and (iii) for each of a plurality of test signals.

4. A method as claimed in claim 1, wherein said data storage medium comprises a magnetic tape.

5. A method as claimed in claim 1, wherein said data storage medium comprises a magnetic disk.

6. In a data storage device having a write channel comprising:

a first current source operable to generate a first current signal of a first variable amplitude;

a second current source operable to generate a second current signal of a second variable amplitude;

a delay device operable to generate a variable delay period between said first and second current signals; and means for adding said first and second current signals having a delay period therebetween to form a data write signal which is input to a write head, a method of optimizing said first variable amplitude, said variable delay period, and said second variable amplitude, said method comprising the steps of:

stepping one of said first variable amplitude, said second variable amplitude and said variable delay period through a plurality of values, while maintaining the other ones of said first variable amplitude, said second variable amplitude and said variable delay period at fixed values;

for each value stepped through, inputting a test signal to said write channel and writing a corresponding output signal of said write channel to a data storage medium;

for each of said output signals written to said data storage medium, reading said output signal from said data storage medium and determining a quality metric of said output signal; and selecting a set of said values which produce corresponding output signals having best quality metrics.

7. A data storage device configured to write data to a data storage medium said data storage device having a write channel comprising:

a first current source capable of generating a first current signal of a first variable amplitude in response to input data signals;

a delay device, capable of delaying said data signals by a variable delay period;

a second current source capable of generating a second current signal of a second variable amplitude, in response to said delayed data signals;

a means for combining said first and second current signals;

a write head for writing said combined first and second current signals to said data storage medium;

wherein said write channel is capable of being optimized such that a frequency content of said combined first and second current signals at least partially compensates for a frequency response roll off of said write head, said optimization being effected by individually optimizing each of said variables of said first current amplitude and said second current amplitude, and said delay period.

8. The data storage device as claimed in claim 7, wherein each said variable is adjustable independently of each other said variable.

9. A method of optimizing a write channel in a data storage device configurable to write data to a data storage medium, said method comprising the steps of:

(i) setting an amplitude of a delayed current to a minimum value;

(ii) setting a delay period of a delayed current to a minimum value;

(iii) setting an amplitude of a main driver current to a minimum value;

(iv) recording a low frequency test signal to said data storage medium;

(v) reading said low frequency test signal from said data storage medium;

(vi) monitoring a quality metric of said read low frequency test signal;

(vii) varying said amplitude of said main driver current over a range of amplitudes; and (viii) repeating steps (iv) to (vi) above at said varied amplitudes of said main driver current;

(ix) selecting an optimum amplitude of said main drive current depending on a result of step (vi);

(x) setting said delay period of said delayed signal to a predetermined value;

(xi) recording a mixed frequency test signal to said data storage medium;

(xii) reading said mixed frequency test signal from said data storage medium;

(xiii) monitoring a quality metric of said read mixed frequency test signal;

(xiv) varying said amplitude of said delayed current over a range of amplitudes; and (xv) repeating steps xi, xii, xiii for each of a set of amplitudes of said delayed currents; and (xvi) selecting an optimum value of said delayed current depending on a result of step xiii.

10. A method as claimed in claim 9, wherein said low frequency test signal comprises a pattern having a frequency that is ¼ of a maximum frequency used to write data to said data storage medium.

11. A method as claimed in claim 9, wherein said quality metric comprises a signal-to-noise ratio.

12. A method as claimed in claim 9, wherein said quality metric comprises a bit error rate.

13. A method as claimed in claim 9, wherein said predetermined value of delay is set in the range ⅕ to ⅘ of the minimum bit period at which said data are written to said data storage medium.

14. A method as claimed in claim 9, wherein said predetermined value of delay is set in the range 2 to 10 nanoseconds.

15. A method as claimed in claim 9, wherein said predetermined value of delay lies within the range 1.8 to 7.2 nanoseconds.

16. A method as claimed in claim 9, wherein said mixed frequency test signal comprises a pseudo-random bit pattern.

17. A method is claimed in claim 9, wherein said mixed frequency test signal comprises a bit pattern having a frequency that is a maximum frequency used to write data to said data storage medium.

18. A method as claimed in claim 17, wherein said step of optimizing said variables comprises the steps:

(a) setting said degree of amplification of said first transconductor to a minimum value;

(b) setting said delay time introduced by said delay device to a minimum;

(c) setting said degree of amplification of said second transconductor to a minimum value;

(d) recording a low frequency test signal to said data storage medium;

(e) reading said low frequency test signal from said data storage medium;

(f) monitoring a measure of said quality of said writing of said low frequency test signals;

(g) varying said degree of amplification of said first transconductor over a range of degrees of amplification;

(h) repeating steps d, e, f above at said varied degrees of amplification of said first transconductor;

(i) selecting an optimum degree of amplification of said first transconductor depending on a result of step f;

(j) setting said delay time of said delay device to a predetermined value;

(k) recording a pseudo-random test signal to said data storage medium;

(l) reading said pseudo-random test signal from said data storage medium;

(m) monitoring a measure of a quality of a said read pseudo-random frequency test signal;

(n) varying said degree of amplification of said second transconductor over a range of degrees of amplification;

(o) repeating steps (k), (l), (m) for each of a set of degrees of amplification of said second transconductor; and (p) selecting an optimum value of said degree of amplification of said second transconductor as a result of step (m).

19. A method as claimed in claim 9, wherein to perform said step of optimization, said data is replaced by a test signal.

20. A method as claimed in claim 9, wherein a frequency of said test signal is varied.

21. A method as claimed in claim 9, wherein said predetermined value of delay is around ⅓ of said minimum bit period.

22. A method as claimed in claim 9, wherein said predetermined value of delay is around 3.5 nanoseconds.

23. A method of writing data to a data storage medium, through a write channel comprising a first transconductor, a delay device and a second transconductor, said method comprising the steps of:

receiving said data from a data source;

writing said data to a first transconductor, wherein a degree of amplification of said first transconductor is varied;

writing said same data to a delay device, wherein a delay time introduced by said delay device is varied;

writing said delayed data to a second transconductor, wherein a degree of amplification of said second transconductor is varied;

combining outputs of said first and said second transconductors;

writing said combined outputs to said data storage medium;

wherein, said write channel is optimized to produce minimum error rate by determining an optimum value of each said variable in response to a measure of quality of said combined outputs as written to said data storage medium.

\* \* \* \* \*